US012141462B2

(12) United States Patent
Venkatanarayanan et al.

(10) Patent No.: US 12,141,462 B2
(45) Date of Patent: Nov. 12, 2024

(54) DATA VOLUME ACCESS PROTOCOL CONVERSION WITHOUT DATA COPY

(71) Applicant: Dell Products L.P., Round Rock, TX (US)

(72) Inventors: Prakash Venkatanarayanan, Framingham, MA (US); David L. Black, Acton, MA (US); Rivka Matosevich, Zichron Ya'acov (IL)

(73) Assignee: Dell Products L.P., Round Rock, TX (US)

( * ) Notice: Subject to any disclaimer, the term of this patent is extended or adjusted under 35 U.S.C. 154(b) by 174 days.

(21) Appl. No.: 18/081,918

(22) Filed: Dec. 15, 2022

(65) Prior Publication Data

US 2024/0201886 A1   Jun. 20, 2024

(51) Int. Cl.
*G06F 3/06*   (2006.01)

(52) U.S. Cl.
CPC ............ *G06F 3/065* (2013.01); *G06F 3/0604* (2013.01); *G06F 3/0634* (2013.01); *G06F 3/0673* (2013.01)

(58) Field of Classification Search
CPC ...... G06F 3/065; G06F 3/0604; G06F 3/0634; G06F 3/0673
USPC .......................................................... 710/11
See application file for complete search history.

(56) References Cited

U.S. PATENT DOCUMENTS

| | | | | |
|---|---|---|---|---|
| 8,352,437 B1* | 1/2013 | Luke | ..................... | G06F 3/0632 707/661 |
| 11,016,866 B2 | 5/2021 | Mu et al. | | |
| 11,100,027 B1* | 8/2021 | Wigmore | ............ | G06F 13/4027 |
| 11,513,731 B2* | 11/2022 | Venkatanarayanan | ....... | G06F 3/0679 |
| 2003/0126327 A1* | 7/2003 | Pesola | ................... | G06F 3/0601 711/112 |
| 2013/0191590 A1* | 7/2013 | Malwankar | ......... | G06F 13/1668 711/E12.019 |
| 2020/0225863 A1* | 7/2020 | Veluswamy | .......... | G06F 3/0647 |
| 2020/0314218 A1* | 10/2020 | Kumar | ................ | G06F 13/4221 |
| 2021/0263665 A1* | 8/2021 | Rao | ....................... | G06F 13/1668 |
| 2021/0405921 A1* | 12/2021 | Venkatanarayanan | ........ | G06F 3/0635 |

* cited by examiner

*Primary Examiner* — Christopher B Shin
(74) *Attorney, Agent, or Firm* — BainwoodHuang

(57) ABSTRACT

A method is disclosed of copy-free, non-disruptive conversion of a storage volume from a first access protocol to a distinct second access protocol. In a preparatory step a destination volume accessible according to the second access protocol is created. A pairing of a token and a handle is created, the token representing data content of the source volume, the handle being associated with the token and usable to represent the source volume according to the second protocol. In response to a subsequent copy-with-handle command, and based on the pairing of the handle with the token, metadata of the destination volume is populated to reference, without copying, the underlying stored data, the destination volume thereafter functioning as the storage volume accessed using the second protocol.

16 Claims, 4 Drawing Sheets

DATA VOLUME ACCESS PROTOCOL CONVERSION WITHOUT DATA COPY

BACKGROUND

The invention is related to data storage.

SUMMARY

A method is disclosed of copy-free, non-disruptive conversion of a storage volume from a first access protocol to a distinct second access protocol. The method includes, in a preparatory step in which the storage volume is identified as a source volume for protocol conversion, creating a destination volume accessible according to the second access protocol, the destination volume created in a storage-sharing domain of the source volume, the storage volume having mapping data referencing underlying stored data. A pairing of a token and a handle is created, the token representing data content of the source volume, the handle being associated with the token and usable to represent the source volume according to the second protocol. In response to a subsequent copy-with-handle command including the handle, and based on the pairing of the handle with the token, metadata of the destination volume is populated to include block mapping information that mirrors the mapping data of the source volume, without copying the underlying stored data, the destination volume thereafter functioning as the storage volume accessed using the second protocol.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Overview

Figure 1B:
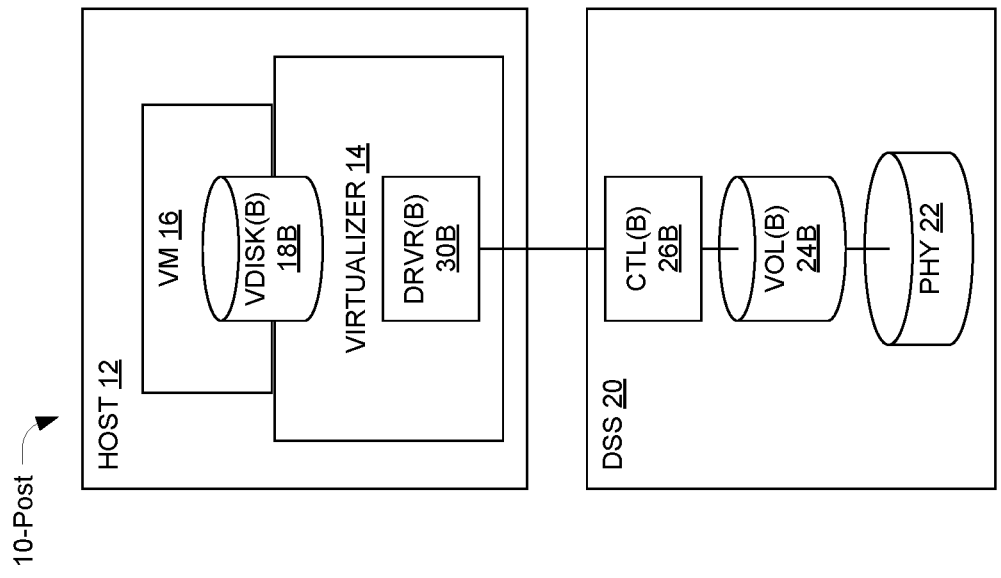
FIGS. 1A and 1B are block diagrams of a computer system in pre-conversion and post-conversion arrangements respectively.

The present disclosure is directed to a technique that is disclosed using a specific example of converting a volume from SCSI access to NVMe access. Those skilled in the art will appreciate that the disclosed technique is more generally applicable to other access protocols, including to convert from NVMe access to SCSI access (reverse direction) for example.

Non-Volatile Memory Express (NVMe) is a new architecture for data storage, from the software stack to the hardware devices and systems. NVMe protocol is designed to provide efficient access to storage devices built with non-volatile memory, from today's NAND flash technology to future, higher performing, persistent memory technologies. There are several performance vectors that NVMe addresses, including bandwidth, IOPs, and latency. For example, the maximum IOPs possible for a Serial ATA device was 200,000, whereas NVMe devices have already been demonstrated that exceed 1,000,000 IOPs.

While the benefits of NVMe technology are apparent, today there is still widespread use of SCSI-type protocols (e.g., SAS, ISCSI, FCP) for storage workloads. The present disclosure is directed to a technique for realizing protocol conversion for a storage array that supports both SCSI-type and NVMe-type protocol access, so that storage users can receive the benefits of using NVMe. Additionally, when storage arrays support NVMe-type protocols (e.g., NVMe/TCP, FC-NVMe), they may also offer NVMe-OF (NVMe Over Fabric) for the host and arrays get this capability, post a firmware upgrade. In such a scenario, the volume which is hosting the user-data remains the same and it is only a protocol switch, for the host from SCSI to NVMe, to access the volumes.

Known solutions for protocol conversion broadly fit in two categories:

1. Disruptive/Offline: All applications with their entire workloads that are running on SCSI are brought down (taken offline) completely. Then, the NVMe specific reconfiguration is done, after which the applications are restarted with NVMe-based storage access. The biggest drawback is that this approach involves a complete planned outage for customer applications.

2. Live Storage Migration: In some environments, there may be mechanisms to non-disruptively move storage volumes across storage arrays (e.g., Storage vMotion in VMware vSphere environments). A significant drawback of this protocol conversion approach is that it is based on host data copy—meaning that the host reads the data from the source and writes the data to the destination. This approach is both inefficient, since the copy is not direct from source to destination, and it places significant load on the host CPU, consuming significant portions of important resources such as processor cycles bandwidth and memory. Additionally, for large configurations, this operation could take a very long time (e.g., days or even weeks), meaning critical resources are occupied managing such a long-term operation.

As an overview, a proposed solution can be generally described as follows:

1. One aspect is to leverage an NVMe offload mechanism and convert a volume between protocols by using a storage migration mechanism (such as Storage vMotion for example) with a special copy offload that eliminates the host data copy, as explained in detail herein.

2. In the offload mechanism, an offload Copy command is used that accommodates source and destination devices of different types, such as a SCSI source with an NVMe destination. The offload Copy command is sent to the destination device. Techniques of indirect access are used to provide the required access for the protocol conversion.

The disclosed technique can avoid the data copy operation altogether and thus provide a fast, non-disruptive, seamless, and no-copy protocol switch. If any copying should be necessary, that copying can be done by the array in an optimized fashion that avoids host-based copy. Also, as a fallback, host-based copy is still available as a last resort, when the offloads do not work or cannot be used.

Embodiments

Figure 1A:
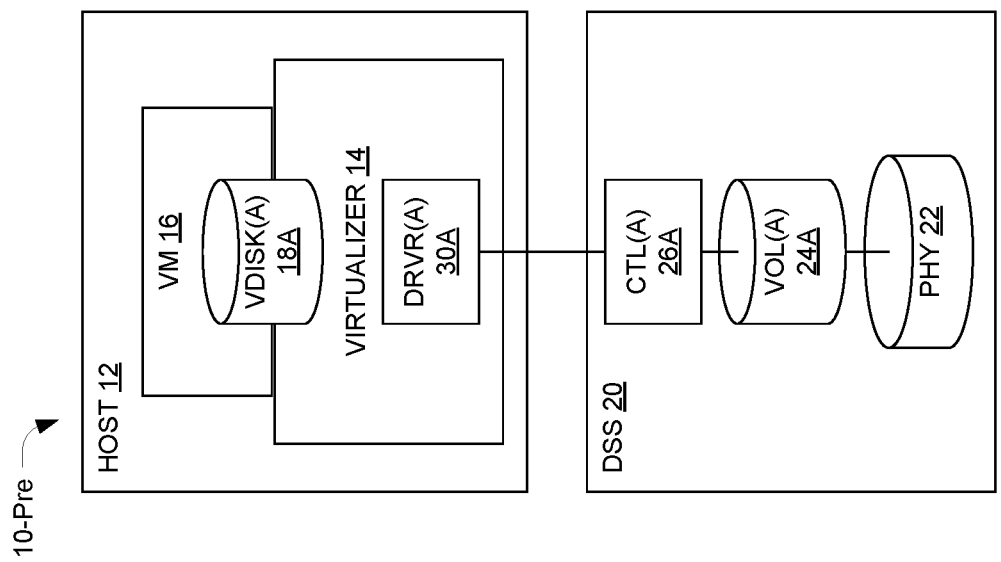

FIGS. 1A and 1B show a computer system 10 in a pre-conversion arrangement 10-Pre and a post-conversion arrangement 10-Post respectively. The system includes a host 12 executing a virtualizer 14 and one or more virtual machines (VM) 16. In one arrangement the virtualizer is a hypervisor such as in VMware® environments, but it may be realized in other ways. The VM 16 is provided persistent secondary storage in the form of a virtual disk (VDISK) 18 from the virtualizer 14. The system further includes a data storage system (DSS) 20 that provides the underlying physical storage for the virtual disk 18, in the form of physical storage device(s) (PHY) 22 and an overlying logical volume (VOL) 24. In each arrangement the DSS 20 provides access using a respective control component (CTL) 26.

In FIGS. 1A and 1B the suffixes "A" and "B" are used to denote two distinct types of the respective components. The components 18A, 30A, 26A and 24A of the pre-conversion arrangement 10-Pre are of a first type, while in the post-conversion arrangement 10-Post the counterparts 16B, 30B, 26B and 24B are of a second type. The present description is based largely on the example of conversion from SCSI (an example of type "A") to NVMe (example of type "B"). Those skilled in the art will appreciate that the disclosed techniques are applicable to alternative embodiments that may convert between other specific types, including converting in the reverse direction from NVMe to SCSI for example.

The control components 26 may be of different types depending on the type of the associated volumes 24. In the case of SCSI, the DSS-resident control components 26 may be referred to as a "target" or "interface", for example, while for NVMe its control component 26 may be an NVMe controller. The general term "control logic" or "control component" is used to signify the more general applicability of the disclosed technique.

The virtualizer 14 accesses the stored data storage of the DSS 20 using a device driver 30. In the pre-conversion arrangement 10-Pre the device driver is a SCSI driver 30A, while in the post-conversion arrangement 10-Post the device driver is an NVMe driver 30B. In operation, it is assumed that the system has had the pre-conversion arrangement 10-Pre up to some point, where it is desired to transition from SCSI access of the volume 24A to NVMe access to a substitute volume 24B, still based on the same underlying data 22. Thus, a conversion or transition process is used to switch the system from the pre-conversion arrangement 10-Pre to the post-conversion arrangement 10-Post, at which point the system begins operating using NVMe access of the volume 24B.

Figure 2C:
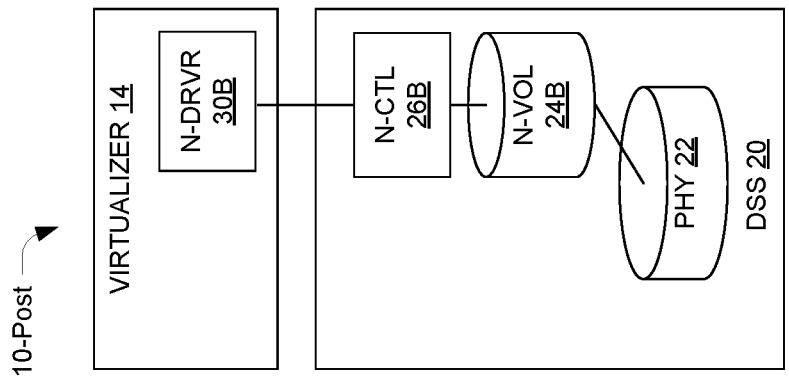
FIGS. 2A-2C are more detailed block diagrams of the computer system in pre-conversion, intermediate, and post-conversion arrangements respectively.
Figure 2B:
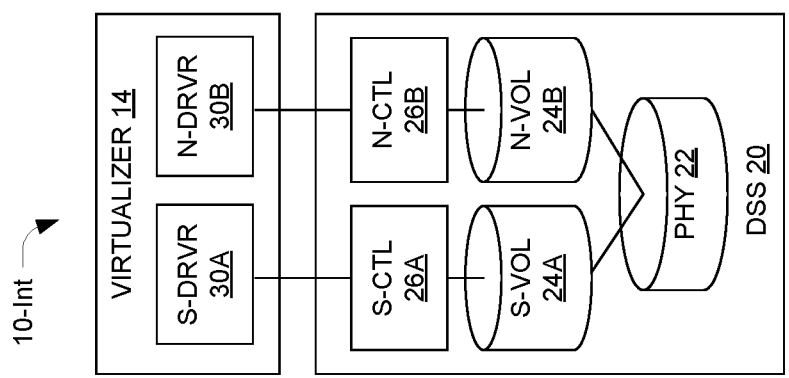
Figure 2A:
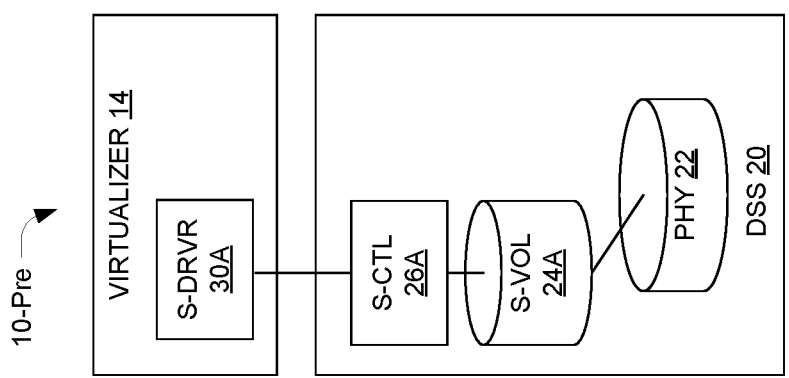

FIGS. 2A-2C illustrate additional detail of the pre- and post-arrangements and the transition. In these Figures the A-type components are further identified as SCSI-type components by the prefix "S-", and the B-type components as NVMe components by the prefix "N-", according to the specific example as mentioned above. In the pre-conversion arrangement 10-Pre (FIG. 2A), the virtualizer 14 employs a SCSI driver 30A, and the storage system 20 includes a SCSI volume 24A and SCSI control component (S-CTL) 26A. The SCSI volume 24A includes SCSI block mapping information that provides a SCSI-based view of the underlying stored data 22 to the SCSI driver 30A of the virtualizer 14. Analogously, in the post-conversion arrangement 10-Post (FIG. 2C), the virtualizer 14 employs an NVMe device driver 30B, and the storage system 20 includes an NVMe volume 24B and NVMe control component (N-CTL) 26B. The NVMe volume 24B includes an NVMe mapping information that provides an NVMe-based view of the underlying data to the NVMe driver 30B of the virtualizer 14. FIG. 2B illustrates an intermediate arrangement 10-Int that exists during the conversion process. In this arrangement 10-Int the storage system 20 temporarily includes both the S-VOL 24A and the N-VOL 24B as well as their respective control components 26A, 26B, and the virtualizer 14 temporarily uses both the SCSI driver 30A and the NVMe driver 30B. Details of the conversion process that includes operation with the intermediate arrangement 10-Int are provided below.

Figure 3:
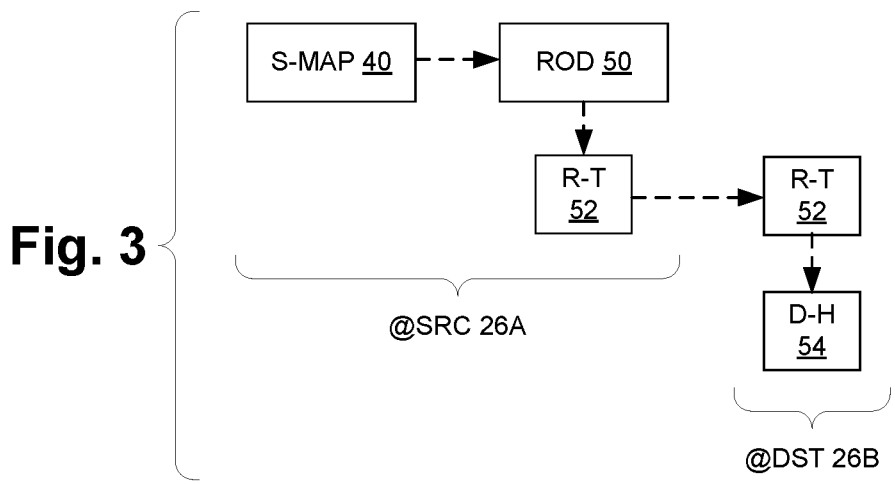
FIG. 3 is a schematic depiction of the generation of a representation of data (ROD) token and a data handle.

FIG. 3 illustrates additional structure and functionality that are utilized in the conversion process. The process employs data items referred to as a representation of data (ROD) 50, a ROD token (R-T) 52, and a data handle (D-H) 54. A ROD provides a way to represent multiple bytes of stored data. Two examples ROD types are "Access upon reference" and "Point in time copy". For an "Access upon reference" ROD, subsequent writes to the volume that the ROD was created from propagate to the data represented by the ROD (i.e., the data is modified by the write), while for a "Point in time copy" ROD subsequent writes do not propagate (data is not modified).

In operation, the control component 26A (which is shown as "source" (SRC)) creates the ROD 50 based on the underlying data 22, and further creates the rod token 52 from the ROD 50. The rod token 52 is passed to the control component 26B (shown as "destination" (DST)) which uses it to create the data handle 54. Specifics of these items and the associated operations are described more below.

In an example with certain specific details, the proposed solution can be described as follows:

1. One key idea is to leverage the NVMe offload mechanism and convert a volume between protocols by using a migration mechanism (e.g., Storage vMotion) with a special copy offload that eliminates the host data copy.
2. In the offload mechanism, the NVMe Copy command is sent to the destination volume, which uses NVMe in this case. The source volume is SCSI, indicating that a protocol conversion is required.
3. The NVMe offload uses the Data-Handle, which in general refers to a source volume that is not directly accessible from the Destination NVMe controller. In one usage the source volume may be a source NVMe Name Space (NS) Volume, but as explained below in the present process it is used differently.
4. The destination controller is receiving the Copy command from the host, and because this NVMe controller cannot access the source NS directly, the Data-Handle is used for such cases and this mechanism is part of the NVMe copy offload mechanism. The notion of Data-Handle is protocol agnostic and sufficiently general that it can also refer to a ROD (Representation Of Data) token in addition to an NVMe NS.
    a. In other words, this Data Handle has no dependency on protocol specific identifiers and does not require the host to know anything about the internal representation of a storage volume in the data storage system (DSS) 20.
    b. Plus, this Data-Handle is DSS-specific and not NVMe- or SCSI-specific (i.e., it is agnostic to source of data).

c. There is also an NVMe design rationale for using Data-Handle as an intermediary between a ROD token and a Copy command. Copy is an I/O command that is processed on a performance-optimized NVMe I/O path (I/O Queue), while ROD token processing is potentially extensive. Performance and efficiency can be increased by processing the ROD token on a separate, less-critical Administrative Queue (to generate the Data-Handle), rather than processing it in the I/O path as part of the Copy command.

5. Thus, the technique is based on obtaining a ROD token from a SCSI-accessed volume as a reference to data on that volume. Then the ROD token is used to generate the NVMe DSS-specific data handle. This approach is viable since ROD tokens are not bound to any specific aspect of SCSI or NVMe protocol.

6. The DSS 2—will have been upgraded to provide both SCSI and NVMe/NVMe-OF functionality. Post the upgrade, from the perspective of the DSS 20, the volume 24 which has the data has not changed. So, it is desired to leverage that volume and avoid the data-copy the host protocol is switched from SCSI to NVMe, which is primarily an access protocol change for the host.

7. Host software (e.g., ESXi-stack/Storage V-Motion) knows that the destination is NVMe and source is SCSI. Hence, it can create a ROD token for the source (either for the entire volume or for a given specific range).

8. Host software next generates the NVMe specific Data-Handle, by passing the ROD Token generated from the previous step.

9. When the Destination NVMe controller gets the Data-Handle, which refers to a SCSI-accessed volume (or a data range thereof), the NVMe controller (DSS firmware) has the option to completely avoid the copy (since the underlying volume is same, from DSS's perspective), or, based on implementation, DSS could alternatively do an optimized copy across source and destination.
   a. The ROD token can also specify what copy semantics apply, point-in-time (e.g., implemented by copy-on-write) is a common one used.
   b. In both cases (either no copy or optimized copy), the operation is offloaded to the DSS, so host-based copy is not needed or used, which is a valuable benefit.

10. Also, the mechanism is general enough that a similar flow can be used for the conversion from NVMe to SCSI also (requires NVMe support for generating ROD tokens). So, this common approach, simplifies storage migration operations such as Storage V-Motion within ESXi.

Figure 4:
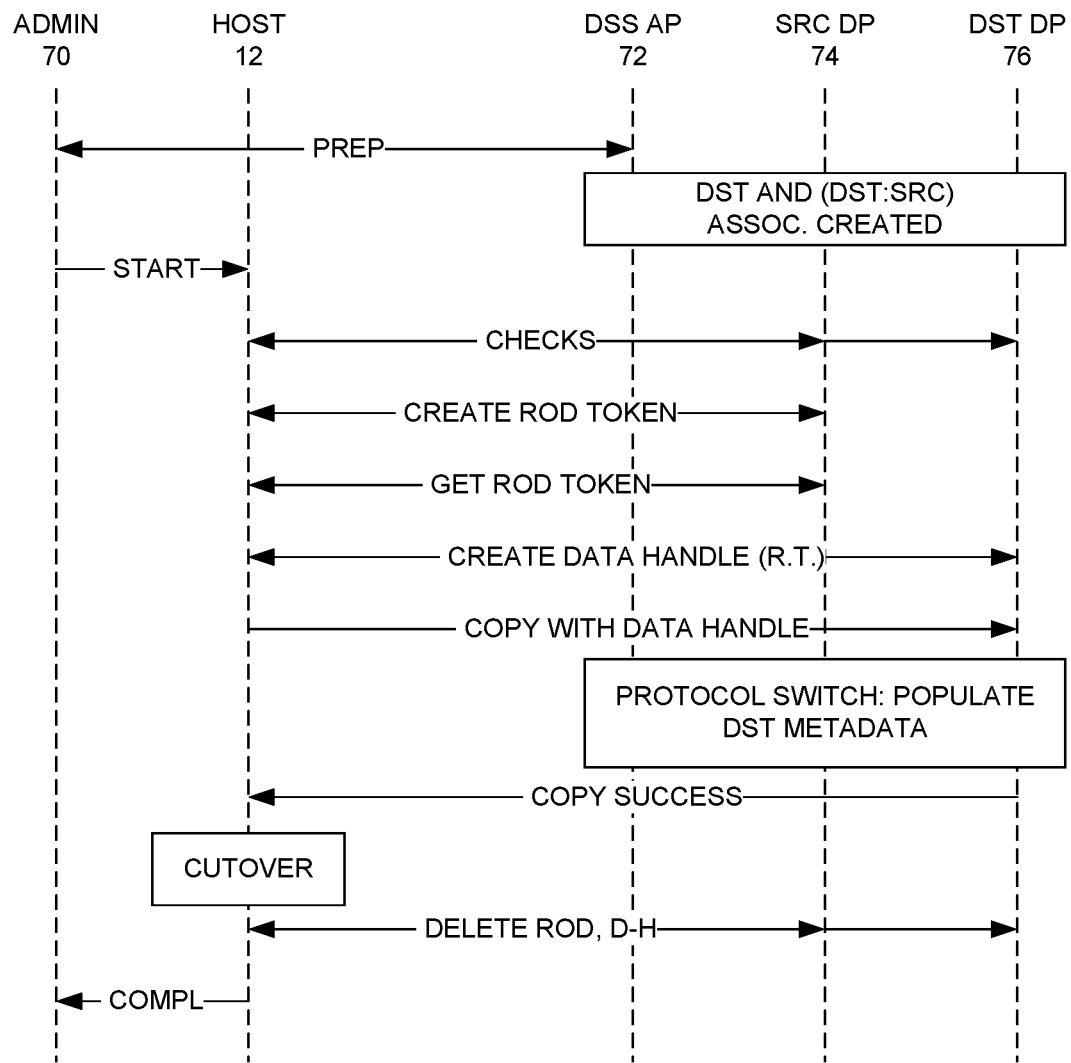
FIG. 4 is a sequence diagram showing messaging and other operations in effecting the conversion from one access protocol to another.

FIG. 4 is a sequence diagram used to describe the overall conversion process in one embodiment. The participants in FIG. 4 include the host 12, a storage administrator (ADMIN) 70, and DSS components including a DSS admin path (DSS AP) 72, source data path (SRC DP) 74, and destination data path (DST DP) 76. The Source DP 74 and destination DP 76 are sub-components of the control components 26A, 26B respectively. The DSS admin path 72 is a more general-function component of the DSS 20. FIG. 4 shows a sequence of messages and related operations proceeding from preparation (PREP) all the way through to completion (COMPL). These are described in sequence below.

1. Preparation

The storage administrator 70 performs preparatory actions at the DSS 20 that enable the protocol switch offload to succeed. The preparatory actions indicate to the DSS 20 that the user is only doing a protocol switch, with the next upcoming NVMe Copy commands, so the DSS 20 is prepared to respond properly when the NVMe Copy commands later arrive.

This preparatory step could also help to simplify array handling for cases in which only a specific source range is specified (e.g., by the Storage V-Motion) and not the entire source volume (i.e., SCSI logical unit or NVMe namespace). Plus, it may provide an opportunity for the DSS 20 to do other related activities—like handling of array snaps and potentially, even handle existing DR relationships as part of the protocol switch.

Additionally, the destination volume is created in this step. It is prepared so that it will be able to access the user data currently accessed by the source volume. This step notifies the DSS 20 that the user is performing a protocol switch.

2. Start

In one embodiment, the process is initiated by the admin 70 initiating a storage migration operation for a VM 16, e.g., by issuing a Storage vMotion (svMotion).

3. Checks

The host 12 checks for ROD support in the source control component 26A and for protocol-switch data handle support in the destination control component 26B. The Destination NVMe Controller (DST DP 76) advertises (via its Identify Controller output) the capability to support Data-Handles, which can represent ROD tokens generated by SCSI protocols. As mentioned, the disclosed technique leverages NVMe offload and extends the source Data Handle to cover SCSI-accessed volumes also, which are within the same DSS 20, thus extending the NVMe offload Copy command for use with protocol conversion.

4. Create Rod Token

5. Get Rod Token

In one embodiment, the host 12 issues a SCSI Create ROD Token command to the source control component 26A to create a ROD 50 for the SCSI source device, either for the desired range or for the entire source volume, and then retrieves the ROD Token 52. Existing SCSI commands (POPULATE TOKEN—opcode: 0x83, Service Action: 0x10 to Create ROD token and RECEIVE ROD TOKEN INFORMATION—opcode: 0x84, Service Action: 0x07 to get ROD token) can be used for this purpose. In alternative embodiments, analogous operations may be performed as part of a SCSI Extended Copy command.

6. Create Data Handle

The host 12 issues a Create Data Handle command to the destination control component 26B. This command contains the ROD Token 52 ("R-T"), which the destination control component 26B uses to create the NVMe DSS-specific Data Handle 54. The Create Data Handle command is an augmentation of a standard NVMe command set (e.g., Admin commands, NVM I/O commands).

The Create Data Handle NVMe command succeeds based on certain conditions being satisfied, which may include (1) the user has done any preparatory actions that are imposed by the DSS 20, (2) the source volume belongs to the same subsystem/array as the destination volume, and (3) the DSS 20 supports an optimized copy or a copy avoidance technique, e.g., by leveraging some form of Clone or using copy-on-write functionality. If any of the required conditions are not satisfied, this Create Data Handle command fails. On a Create Data Handle failure, or if the offload command fails for some reason, the host 12 may fall back to the conventional process of using host-based reads and writes. In general, it may be desirable that the host 12 be capable of such fall back, and it may be initiated either automatically or manually based on the failure. Of course, another possibility is to correct whatever condition caused the failure and then to re-initiate the offload copy operation.

7. Copy with Data Handle

Because the DSS 20 has been notified in the preparation steps that a protocol switch is being performed, it responds to the copy command by performing a metadata update and generally avoiding copying of underlying data of the volume 24 (beyond any copying caused by point-in-time semantics such as copy-on-write). This operation establishes the new volume 24B as the container for the user data previously accessed via the original volume 24A. Copy with Data Handle is also an augmentation of a standard NVMe command set (e.g., Admin commands, NVM I/O commands.

8. Copy Success

The destination control component 26B returns a Copy command with success indication when the metadata update is performed successfully. The virtualizer 14 then performs an internal "cutover" to begin accessing the volume 24 exclusively via the NVMe driver 30B.

9. Delete Rod & Data Handle

This is a cleanup step to remove these data items as well as anything else that was used only for the conversion and has no ongoing use.

10. Completion

The host 10 returns a completion indication (response to the Start at step 2) to the administrator 70.

The following presents certain details of an example of the above operation, as may be present in one or more embodiments.

1. Assume the source range is a contiguous range of blocks, e.g., block N to block M, and a request is sent to create a ROD token.
2. The source control component 26A creates the ROD token 52 (part or all of which may be encrypted)
3. The ROD token 52 could contain information such as the following:
   a. A sequence number to keep track of this ROD token
   b. A tracking number used to track and limit the number of outstanding ROD tokens
   c. A "time-to-live" period
   d. A "pointer" which refers to the range "N to M" blocks. This is preferably a reference to existing data.
   e. Security related data, e.g., a secure hash, digital signature or checksum, which could also convey permissions
4. When this ROD token 52 is passed to destination control component 26B as part of the request to create a data handle, the destination control component 26B may check the following:
   a. Is the ROD token valid? Has it expired (e.g., time-to-live has elapsed)? Other checks for correctness and validity may also be done.
   b. Does destination control component 26B have permission to access the range of blocks indicated by the ROD token
   c. Does the destination control component 26B have resources to create a data-handle as another reference to this "range N to M" blocks
   d. If so, create such a data-handle 54 referring to the same range (e.g., N to M) as in the ROD token
   e. Perform any necessary DSS-specific bookkeeping, for example, setting an indication to avoid copy and convey that this is just a protocol-switch
   f. Return the data-handle 54
5. Then, at the later stage of Copy using Data-Handle:
   a. Check that the Data-Handle has an association with a ROD token and associated source volume as established by preceding preparation and Create Data-Handle steps.
   b. Use DSS-specific metadata to determine that there is no need for physical copy—but just create a volume data structure referring to same underlying data
   c. Update the structure to reflect that this protocol is "NVMe"
   d. Perform any necessary DSS specific book-keeping (for example, keep track of how many conversions have happened)
   e. Return success
6. For the host, it is then able to access a destination NVMe volume which functionally replaces the original SCSI-accessed volume.

Figure 5:
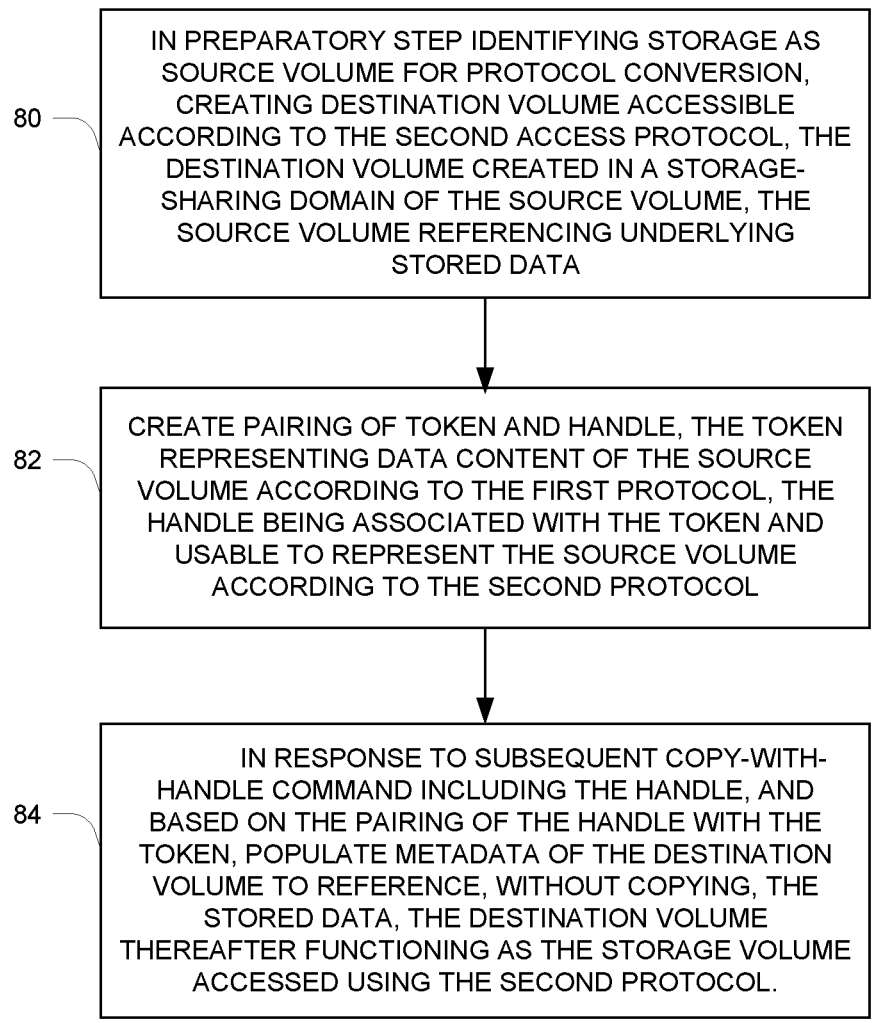
FIG. 5 is a flow diagram of a more generalized flow for volume conversion.

FIG. 5 is a flow diagram for generalized key aspects of the conversion process, which is a method of copy-free, non-disruptive conversion of a storage volume (e.g., volume 24) from a first access protocol to a distinct second access protocol.

At step 80, in a preparatory step in which the storage volume is identified as a source volume for protocol conversion, a destination volume is created that is accessible according to the second access protocol, the destination volume created in a storage-sharing domain of the source volume, the source volume referencing underlying stored data.

At 82, a pairing of a token and a handle is created, wherein the token represents data content of the source volume according to the first protocol, and the handle is associated with the token and usable to represent the source volume according to the second protocol.

At 84, in response to a subsequent copy-with-handle command including the handle, and based on the pairing of the handle with the token, metadata of the destination volume is populated to reference, without copying, the underlying stored data, the destination volume thereafter functioning as the storage volume accessed using the second protocol.

Potential advantages of disclosed technique:

Can accelerate SCSI to NVMe protocol conversion by avoiding the actual data copy, thereby increasing the performance and scalability of mechanisms such as Storage vMotion for such operations. In other words, this approach is a method for copy offloads that can be carried out between access protocols. The method uses a ROD token to identify a volume or a range within the volume. This token is protocol agnostic and array volume representation can be kept opaque from the host. Wherever possible, the DSS 20 can avoid a data copy and provide optimal performance. If need be, it can implement copy-on-write schema to optimize storage consumption.

The host CPU bandwidth and memory are not used for copying in this conversion since there is no actual data-copy.

A DSS 20 can also leverage such a mechanism to copy the source volume's snapshots and other attributes (such as the volume's disaster recovery settings) to the destination, and further extending the functionality of this solution.

The approach can utilize mechanisms such as VMware svMotion and NVMe offload mechanisms. These NVMe aspects could be become part of the NVMe standards and are applicable to hypervisors (e.g., ESXi) in general.

Extending the notion of Data Handle for efficient cross-protocol copy.

The common mechanism can help in conversion in the other direction (NVMe to SCSI) also.

Provides for easy integration by use of native migration mechanisms, e.g., using svMotion for the protocol switch allows easy integration with VMware eco-system.

While various embodiments of the invention have been particularly shown and described, it will be understood by those skilled in the art that various changes in form and details may be made therein without departing from the scope of the invention as defined by the appended claims.

What is claimed is:

1. A method of copy-free, non-disruptive conversion of a storage volume from a first access protocol to a distinct second access protocol, comprising:
in a preparatory step in which the storage volume is identified as a source volume for protocol conversion, creating a destination volume accessible according to the second access protocol, the destination volume created in a storage-sharing domain of the source volume, the storage volume referencing underlying stored data;
creating a pairing of a token and a handle, the token representing data content of the source volume, the handle being associated with the token and usable to represent the source volume according to the second protocol;
in response to a subsequent copy-with-handle command including the handle, and based on the pairing of the handle with the token, populating metadata of the destination volume to reference, without copying, the underlying stored data, the destination volume thereafter functioning as the storage volume accessed using the second protocol.

2. The method of claim 1, wherein the first protocol is a Small Computer Systems Interface (SCSI) protocol and the second protocol is a Non-Volatile Memory Express (NVMe) protocol.

3. The method of claim 2, wherein the storage volume is stored in a data storage system and accessed by a separate host computer.

4. The method of claim 3, wherein data storage system and host computer have a pre-conversion arrangement, a post-conversion arrangement, and an intermediate arrangement existing during the non-disruptive conversion, and (1) in the pre-conversion arrangement, the data storage system includes a SCSI component that provides a SCSI-based view of underlying data to a SCSI driver of the host computer, (2) in the post-conversion arrangement, the data storage system includes an NVMe component that provides an NVMe-based view of the underlying data to an NVMe driver of the host computer, and (3) in the intermediate arrangement the data storage system temporarily includes both the SCSI component and the NVMe component, and the host computer temporarily uses both the SCSI driver and the NVMe driver.

5. The method of claim 3, wherein the handle is specific to the data storage system and is usable in connection with the NVMe protocol.

6. The method of claim 3, wherein creating the pairing of the token and the handle includes:
by the host computer, issuing respective commands to a source control component of the data storage system to create the token and to provide the token to the host computer, and in response to receiving the token, issuing a command to a destination control component of the data storage system forwarding the token and indicating that the destination control component is to create the handle from the token as contained in the command; and
at the data storage system, (1) by the source control component, creating the token and returning it to the host computer in response to the commands from the host computer, and (2) by the destination control component, creating the handle from the token in response to the command from the host computer.

7. The method of claim 6, wherein the host computer explicitly checks for token support by the source control component and for handle support by the destination control component prior to issuing the commands to create and provide the token and to create the handle.

8. The method of claim 6, wherein the destination control component performs checks as a condition to creating the handle including (1) whether a user has performed preparatory actions imposed by the data storage system, (2) the source volume belongs to the same subsystem as the destination volume, and (3) the data storage system supports an optimized data copy or a copy avoidance technique.

9. A computer system having a host computer coupled to a data storage system, the data storage system hosting a storage volume, the host computer and data storage system being configured and co-operative to perform a method of copy-free, non-disruptive conversion of the storage volume from a first access protocol to a distinct second access protocol, the method including:
in a preparatory step in which the storage volume is identified as a source volume for protocol conversion, creating a destination volume accessible according to the second access protocol, the destination volume created in a storage-sharing domain of the source volume, the storage volume referencing underlying stored data;
creating a pairing of a token and a handle, the token representing data content of the source volume, the handle being associated with the token and usable to represent the source volume according to the second protocol;
in response to a subsequent copy-with-handle command including the handle, and based on the pairing of the handle with the token, populating metadata of the destination volume to reference, without copying, the underlying stored data, the destination volume thereafter functioning as the storage volume accessed using the second protocol.

10. The computer system of claim 9, wherein the first protocol is a Small Computer Systems Interface (SCSI) protocol and the second protocol is a Non-Volatile Memory Express (NVMe) protocol.

11. The computer system of claim 10, wherein the storage volume is stored in a data storage system and accessed by a separate host computer.

12. The computer system of claim 11, wherein data storage system and host computer have a pre-conversion arrangement, a post-conversion arrangement, and an intermediate arrangement existing during the non-disruptive conversion, and (1) in the pre-conversion arrangement, the data storage system includes a SCSI component that provides a SCSI-based view of underlying data to a SCSI driver of the host computer, (2) in the post-conversion arrangement, the data storage system includes an NVMe component that provides an NVMe-based view of the underlying data to an NVMe driver of the host computer, and (3) in the intermediate arrangement the data storage system temporarily includes both the SCSI component and the NVMe component, and the host computer temporarily uses both the SCSI driver and the NVMe driver.

13. The computer system of claim 11, wherein the handle is specific to the data storage system and is usable in connection with the NVMe protocol.

14. The computer system of claim 11, wherein creating the pairing of the token and the handle includes:

by the host computer, issuing respective commands to a source control component of the data storage system to create the token and to provide the token to the host computer, and in response to receiving the token, issuing a command to a destination control component of the data storage system forwarding the token and indicating that the destination control component is to create the handle from the token as contained in the command; and at the data storage system, (1) by the source control component, creating the token and returning it to the host computer in response to the commands from the host computer, and (2) by the destination control component, creating the handle from the token in response to the command from the host computer.

15. The computer system of claim 14, wherein the host computer explicitly checks for token support by the source control component and for handle support by the destination control component prior to issuing the commands to create and provide the token and to create the handle.

16. The computer system of claim 14, wherein the destination control component performs checks as a condition to creating the handle including (1) whether a user has performed preparatory actions imposed by the data storage system, (2) the source volume belongs to the same subsystem as the destination volume, and (3) the data storage system supports an optimized data copy or a copy avoidance technique.

* * * * *